United States Patent Office 3,115,413
Patented Dec. 24, 1963

3,115,413
PROCESS OF SPRAY DRYING EGGS
Leo Kline, El Cerrito, John J. Meehan, Pinole, and Takashi F. Sugihara, Richmond, Calif., assignors to the United States of America as represented by the Secretary of Agriculture
No Drawing. Filed Oct. 3, 1961, Ser. No. 142,741
7 Claims. (Cl. 99—210)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has as its principal object the provision of novel methods for drying eggs. Further objects of the invention will be evident from the following description wherein parts and percentages are by weight unless otherwsie specified.

It is common practice in the industry to dehydrate egg liquids by spray drying. The process has the advantage of simplicity in that it basically involves atomizing the egg liquid into a current of hot air. Also, the product is satisfactory for many purposes and is widely used, for example in the baking industry. It is known, however, that conventional spray dried egg products have certain inherent deficiencies. Notable among these is poor dispersibility characteristics. Thus, when the products are mixed with water to reconstitute them, they tend to resist complete solution by forming clumps of material which are wet on the outside but dry on the inside. This phenomenon has been attributed to various factors including particle size, configuration, surface characteristics, etc. It has been postulated that the first contact of the dried egg particles with water causes a skin of concentrated solution to form about the particles which impedes penetration of water. A further contributing factor is that the thick walls of the particles trap air so that the particles float, whereby contact with water is diminished. In the case of products containing yolk, there is also a translocation of fat to the surfaces of the particles (fatting-off) so that their surfaces exhibit a hydrophobic nature and so repel water. However, regardless of the theories involved, the fact remains that from a practical standpoint the conventional spray-dried egg products resist rapid and complete reconstitution in water.

Various procedures are advocated as a means of improving the dispersibility of wettability of spray-dried eggs. One technique, for example, involves subjecting the spray-dried product to warm and moist conditions to cause agglomeration of individual particles into small clumps. The resulting agglomerated product is then subjected to a current of hot air to remove the added moisture. Such procedures have the obvious disadvantage of complexity in that the liquid egg is first dried, then moistened, then re-dried.

By application of the principles described herein, products of greatly improved character are obtained by a simple technique which completely eliminates the cumbersome features of the aforementioned agglomeration method.

It has also been suggested that the problem of poor dispersibility be alleviated by producing larger particles through the use of spray-drying systems wherein the egg liquid is sprayed from the nozzles as coarse particles. Such systems have the disadvantage that an exceptionally long drying chamber is needed because of the slow rate of moisture evaporation from the coarse particles. This disadvantage is obviated by application of the principles of the present invention. Although the process of the invention generally yields larger particles, the rate of evaporation is so high that one can use standard spray-drying equipment as with conventional spray drying of fine particles. Thus the invention has the advantage that a product of improved dispersibility is obtained without requiring any extra investment in drying equipment.

In accordance with the invention, the egg liquid to be dried is impregnated with a gas and the resulting gasified egg liquid is then spray dried in the usual manner. Although the step of impregnating with gas may appear as a minor departure from the usual spray-drying procedure, it actually results in many significant advantages from both a product as well as a procedural standpoint. These items are discussed below.

A principal consideration is that the products of the invention have improved dispersibility as compared to conventional spray-dried products. Thus, when the products are mixed with water they go into solution rapidly without clumping. Their dispersibility characteristics are so improved that hand mixing with a spoon is sufficient to attain solution in a manner of a minute or less. The use of high-speed, power-operated mixers is totally unnecessary with the products produced as described herein. This improvement in dispersibility is ascribed to two separate factors; one relating to size and shape of the particles, the other relating to surface characteristics. Conventional spray-dried egg is in the form of minute hollow spheres with relatively thick walls. On the other hand, the present products are spherical and hollow but of a larger diameter. Also, these spheres have very thin walls and in these walls are many bubble-like or blister-like formations. Usually, most of these bubble or blister formations are ruptured so that the exceedingly fine pellicular walls of the spheres are provided with numerous apertures. Also, the thin walls of the particles are fragile so that during drying and subsequent handling many of the spherical particles are shattered, forming fragments of spheres. This characteristic structure of the particles produced in accordance with the invention facilitates entry of water when the product is reconstituted and leads to rapid dispersion. Another factor is that the particles produced in accordance with the invention have such surface characteristics that they are readily wet by water. This factor augments the speed of reconstitution.

The products of the invention are free-flowing and non-caking. These properties are advantageous in dispensing the products, inert gas packaging, filling them into containers, or blending them with other materials in preparing baking formulations. In such operations, the products may be poured directly without any sifting as necessary with conventional spray-dried products.

Another advantage of the invention is that the gasification of the liquid egg affords a greater throughput of material through the spray drier per unit time, using the same air temperature and flow rate. This is obviously an important technical advantage as a spray drier of given size can be utilized to greater advantage, i.e. produce more dried product, when operated on the gasified feed than when operated on the regular egg liquid in the usual manner. Also, such high rates of evaporation are attained in operating in accordance with the invention that one can use air temperatures lower than with conventional operations whereby to avoid any possibility of heat damage to the protein constituents of the egg material being processed.

A further consideration is that the bulk density of the products of the invention may be readily controlled by regulating the nature and amount of the gas incorporated into the egg liquid. Thus, in general, a greater proportion of gas will yield a product of lesser bulk density. This flexibility of control is important when the product is to be packaged by volume and is in contrast to conventional spray drying of egg liquid where bulk density can be varied only to a limited extent by changes in orifice dimensions, pressure of atomization, and drying air temperature. Also, application of the process of the invention makes possible the preparation of dried products having a bulk density lower than that obtainable with conventional spray drying.

Another advantage is that the process of the invention can be readily adjusted to yield products which when mixed with water produce voluminous foams without whipping. This is desirable in many uses of the products, for example, in preparing omelets, souffles, and baked goods such as sponge cakes and angel food cakes. The foaming power of the products is enhanced by applying such adjustments as using coarser spray particles, atomizing at lower pressures, and increasing the pressure of gasification.

An additional advantage of the invention is that the improved results as regards dispersibility etc. are attained without sacrifice of other important properties. Thus the products of the invention retain all the functional properties of the egg liquid as regards aeration and whipping quality. The baking quality of the products of the invention are compared with standard spray-dried egg powder in Example 4, below. Also, the soluble nitrogen content of the products—a measure of protein quality—is shown in Tables 1, 2, and 3, below.

The process of the invention may be utilized for the drying of any egg liquid, which term is understood to include egg white, egg yolk, and mixtures of white and yolk. The egg liquid may contain the usual additives such as corn syrup solids, sucrose, milk, shortening, salt, glycerol, malt syrup, etc., as conventional in preparing dried egg products.

In general, the gas used to impregnate the egg liquid prior to spray drying may be any non-toxic gas which will not cause any detriment to the egg liquid. It is generally preferred to use gases which are fairly soluble in egg liquid, typically carbon dioxide or nitrous oxide. Other examples of gases which may be used are air, nitrogen, helium, propane, n-butane, isobutane, dichlorodifluoromethane, trichloromonofluoromethane, trifluoromonochloromethane, and the like. Where it is intended to prepare a product which is to be stable on extended storage, it is preferred to avoid the use of air. In such event, any of the non-oxidizing gases may be used. In the preferred embodiment of the invention, carbon dioxide is used as the impregnating gas. This gas is not only inexpensive but it has a high solubility in egg liquid so that it is especially effective to produce the desired results and being of a non-oxidizing nature the products have especially good stability; this latter fact being due to the substantial amounts of carbon dioxide occluded in the product, dissolved in the fat phase and adsorbed on the surface of the product.

In applying the invention, the step of gasifying the egg liquid can be accomplished with any type of apparatus adapted for impregnating liquids with gases or injecting gases into liquids. A typically useful device is a carbonator conventionally used to incorporate carbon dioxide into soft drinks, wines, beer, etc. In the carbonator, the egg liquid is intimately mixed with the gas supplied under pressure. The gasified egg liquid is then pumped under a pressure greater than that employed in the gasification step (to prevent escape of gas) to the spray nozzle of the spray drier. The amount of gas introduced into the egg liquid may be varied depending on such factors as the solubility of the selected gas in egg liquid, the type of egg liquid used, and the type of product desired. In general, the greater the amount of gas incorporated into the egg liquid, the more marked will be the difference of the product from conventional spray-dried products. For example, as the amount of gas is increased, the particle size of the product will increase and its bulk density will decrease. In a preferred embodiment of the invention, the gas under pressure is injected into the egg liquid until the pressure of the gasified liquid is at least 15 p.s.i.g. (The expression "p.s.i.g." used herein means pounds per square inch, gauge pressure.) For best results it is further preferred to saturate the egg liquid with a gas to provide a gasified liquid which exhibits an equilibrium pressure of at least 15 p.s.i.g. By equilibrium pressure is meant that after introduction of a selected amount of gas, the pressure on the gas-liquid system is observed and if the pressure remains essentially constant, the system is in equilibrium. If the pressure falls, it is obvious that a further injection of gas is required to saturate the egg liquid. The time required to establish equilibrium will depend on various factors including the solubility of the selected gas in the egg liquid, the temperature of the egg liquid, the pressure at which the gas is injected into the egg liquid, the degree of agitation of contact of the gas and egg liquid, etc.

As noted above, it is preferred to charge the egg liquid with gas to at least 15 p.s.i.g. It is obvious that higher pressures may be used to obtain products of greater particle size and lesser bulk density. Usually, it is preferred not to exceed a pressure of about 150 p.s.i.g., thus to avoid producing products of exceedingly low bulk density. If, however, it is desired to produce products of very low bulk densities, then pressures above this level may be employed.

It is evident that when the egg liquid is impregnated with the gas under pressure, the gas will be dissolved in the egg liquid to a greater or lesser extent depending on such factors as temperature, time, solubility of the gas selected, particular pressure chosen, etc. In cases where the amount of gas is greater than that which can be dissolved in the egg liquid, the extra amount of gas above that required for saturation will be suspended in the egg liquid. In the preferred methods of gasifying the egg liquid, a substantial degree of agitation or mixing is applied to the gas-egg liquid system so that undissolved gas will be uniformly dispersed throughout the liquid phase in the form of minute particles. Ordinarily, the gasification is accomplished at ordinary (room) temperature. However, if desired, the egg liquid may be cooled to any desired temperature as long as it remains in a liquid condition. It is evident that such cooling will make possible the solution of a greater proportion of gas in the egg liquid. Where cooling is used, a preferred temperature range is about from 30 to 50° F.

After gasifying the egg liquid, the system of gas and egg liquid—still held under pressure—is pumped to the nozzle of the spray drier. It is evident that during any operations which involve holding the gas-egg liquid system or conveying it to the nozzle, the system must be kept under a pressure at least as high as the gasifying pressure initially selected. This is done to prevent loss of gas. Were the pressure to be reduced—for example, to atmospheric pressure—the gas would be largely dissipated. Thus egg liquid cannot retain enough gas at ordinary (atmospheric) pressure to accomplish the desired effects of increased dispersibility of the product and other advantages attained in accordance with the invention. The pumping pressure usually used to force the gasified egg liquid through the spray nozzle or atomizer may range anywhere from 100 to 5,000 p.s.i.g. depending on such factors as the size of the orifices in the nozzle, the throughput of gasified liquid, and the like. No novelty is claimed in such items as the design of the spray nozzles or other structure of the spray drier, the type of air flow used, the temperature of the air stream, etc. All these items are conventional and are applicable to use in the process of the invention. Also, as in conventional practice the input of gasified egg liquid, the input of hot air and its temperature are so controlled that the dried egg product contains about 1.5 to 8% moisture, preferably 2.5 to 5%.

The invention is further demonstrated by the following illustrative examples. In some of the runs the egg liquid was not gasified. These runs are not illustrative of the invention but are included for comparative purposes.

The dispersibility of the products, referred to in the tables below, was ascertained in the following manner: A 5-gram sample of dried egg (moisture-free basis) and 45 ml. water were placed in a stoppered 1,000-ml. cylinder. The cylinder was inverted five times over a period of ten seconds, then filtered rapidly through a milk filter disc. The filtrate was then dried to ascertain the proportion of egg solids dispersed.

EXAMPLE 1

The egg liquid in this case was whole egg containing 10% corn syrup solids having a dextrose equivalent of 24.

A. The egg liquid at 40° F. was recirculated through a beverage carbonator wherein it was intimately contacted with carbon dioxide gas. The recirculation was continued until the equilibrium pressure of the gasified egg liquid was 40 p.s.i.g. The gasified egg liquid was then pumped at a pressure of 500 p.s.i.g. to the spray nozzle of a conventional spray drier wherein the spray was contacted with air at 275° F.

B. Egg liquid was treated with $CO_2$ as in part A to establish an equilibrium pressure of 40 p.s.i.g. The gasified egg liquid was then again passed through the carbonator where it was given an additional injection of $CO_2$ gas at 150 p.s.i.g. The gasified egg liquid was then pumped to the spray drier at 500 p.s.i.g.

C. In this control run, the egg liquid without addition of $CO_2$ was pumped at 500 p.s.i.g. to the spray drier.

The three products were collected from the cyclone collector of the drier and tested. The results are tabulated below.

*Table 1*

SPRAY DRYING OF WHOLE EGG (+10% C.S.S.) AT 500 P.S.I.G. FEED PRESSURE

| Run | $CO_2$ | Bulk density, g./ml. | Dispersibility, percent | Soluble nitrogen, percent of total N | Particle size, microns | | $H_2O$, percent |
|---|---|---|---|---|---|---|---|
| | | | | | Range | Average | |
| A | Yes | 0.16 | 75.3 | 93.5 | 30–200 | 75 | 3.2 |
| B | Yes | 0.10 | 83.8 | 93.5 | 25–275 | 130 | 4.1 |
| C | No | 0.45 | 56.4 | 93.6 | 10–80 | 35 | 3.3 |

EXAMPLE 2

The egg liquid in this case was whole egg containing 10% corn syrup solids (dextrose equivalent 24).

A. The egg liquid at 40° F. was recirculated through a beverage carbonator wherein it was intimately contacted with carbon dioxide gas. The recirculation was continued until the equilibrium pressure of the gasified egg liquid was 40 p.s.i.g. The gasified egg liquid was then pumped at a pressure of 150 p.s.i.g. to the spray nozzle of a spray drier wherein the spray was contacted with air at 275° F.

B. Egg liquid was treated with $CO_2$ as in part A to establish an equilibrium pressure of 40 p.s.i.g. The gasified egg liquid was then again passed through the carbonator wherein it was given an additional injection of $CO_2$ gas at 150 p.s.i.g. The gasified egg liquid was then pumped to the spray drier at 150 p.s.i.g.

C. In a control run the egg liquid without addition of $CO_2$ was pumped at 150 p.s.i.g. to the spray drier.

It was observed that run C was a failure, in that most of the egg material did not dry but wet the walls of the drying chamber.

The products of runs A and B were collected and tested. The results are tabulated below.

*Table 2*

SPRAY DRYING OF WHOLE EGG (+10% C.S.S.) AT 150 P.S.I.G. FEED PRESSURE

| Run | $CO_2$ | Bulk density, g./ml. | Dispersibility, percent | Soluble nitrogen, percent of total N | Particle size, microns | | $H_2O$, percent |
|---|---|---|---|---|---|---|---|
| | | | | | Range | Average | |
| A | Yes | 0.08 | 99.7 | 92.5 | 130–500 | 200 | 4.9 |
| B | Yes | 0.08 | 97.8 | 92.5 | 175–600 | 250 | 5.4 |
| C | No | Run failed—no dried product collected | | | | | |

EXAMPLE 3

The egg liquid in this case was whole egg containing 10% added sucrose.

A. The egg liquid at 40° F. was recirculated through a beverage carbonator wherein it was intimately contacted with carbon dioxide gas. This recirculation was continued until the equilibrium pressure of the gasified egg liquid was 40 p.s.i.g. The gasified egg liquid was then again passed through the carbonator wherein it was given an additional injection of $CO_2$ gas at 150 p.s.i.g. The gasified egg liquid was then pumped at a pressure of 500 p.s.i.g. to the spray nozzle of a conventional spray drier where the spray was contacted with air at 300° F.

B. In a control run the egg liquid without addition of $CO_2$ was pumped at 500 p.s.i.g. to the spray drier.

The two products collected from the drier were tested. The results are tabulated below.

*Table 3*

SPRAY DRYING OF WHOLE EGG (+10% SUCROSE) AT FEED PRESSURE OF 500 P.S.I.G

| Run | $CO_2$ | Bulk density, g./ml. | Dispersibility, percent | Soluble nitrogen, percent of total N | Particle size, microns | | $H_2O$, percent |
|---|---|---|---|---|---|---|---|
| | | | | | Range | Average | |
| A | Yes | 0.06 | 95.1 | 93.6 | 50–350 | 180 | 2.7 |
| B | No | 0.37 | 75.5 | 96.6 | 15–100 | 35 | 3.8 |

EXAMPLE 4

Standard yellow layer cakes were made in which the egg content was supplied by (a) the product of the invention (Example 2, run A) and (b) a commercial spray-dried whole egg powder. The results are tabulated below.

*Baking Test*

| Sample | Egg Content | Cake Volume, ml. | Specific Volume, ml./gm. batter |
|---|---|---|---|
| (a) | Product of Example 2, run A | 1,187 | 3.21 |
| (b) | Commercial spray-dried egg | 1,186 | 3.20 |

The fact that the products of the invention retain the functional properties of the original egg liquid is also demonstrated in Examples 1, 2 and 3. Reference in this regard is made to Tables 1, 2 and 3, particularly the columns referring to the soluble nitrogen content which is a measure of the quality of the protein in the products. Had the functional properties of the egg material been damaged, the soluble nitrogen contents would have been substantially lower than actually found.

Having thus described the invention, what is claimed is:

1. In the process of preparing dried egg by spray drying egg liquid, the improvement which comprises injecting a non-toxic gas under pressure into the egg liquid, and feeding the gasified egg liquid to the spray drier at a pressure sufficiently high to prevent escape of the added gas.

2. The process of claim 1 wherein the egg liquid is gasified at a temperature lower than room temperature but high enough for it to remain a liquid.

3. The process of claim 1 wherein the egg liquid is gasified at a temperature of about 40° F.

4. In the process of preparing dried egg by spray drying egg liquid, the improvement which comprises saturating the egg liquid with a non-toxic gas at a pressure of at least 15 p.s.i.g., and feeding the gasified liquid to the spray drier at a pressure at least as high as the saturation pressure.

5. The process of claim 4 wherein the gas is $CO_2$.

6. In the process of preparing dried egg by spray drying egg liquid, the improvement which comprises cooling the egg liquid and intimately contacting it with sufficient $CO_2$ gas to saturate the egg liquid therewith at a pressure of at least 15 p.s.i.g., further admixing additional $CO_2$ to the egg liquid in an amount above the saturation level and feeding the gasified egg liquid to the spray drier at a pressure sufficient to retain all the added carbon dioxide.

7. In the process of preparing dried egg by spray drying of egg liquid, the improvement which comprises injecting a non-toxic gas into the egg liquid prior to spray drying and feeding the gasified egg liquid to the spray drier at a pressure sufficiently high to prevent escape of the added gas whereby to increase dispersibility of the product, increase paritcle size of the product, decrease bulk density of the product, and yield a free-flowing, non-caking product.

References Cited in the file of this patent

UNITED STATES PATENTS

| | | |
|---|---|---|
| 2,771,364 | Chase et al. | Nov. 20, 1956 |
| 2,788,276 | Reich et al. | Apr. 9, 1957 |
| 2,796,352 | Forsythe et al. | June 18, 1957 |
| 2,082,098 | Berquist | Mar. 19, 1963 |